R. CRUIKSHANK.
Milk Rack.
No. 38,625.
Patented May 19, 1863.
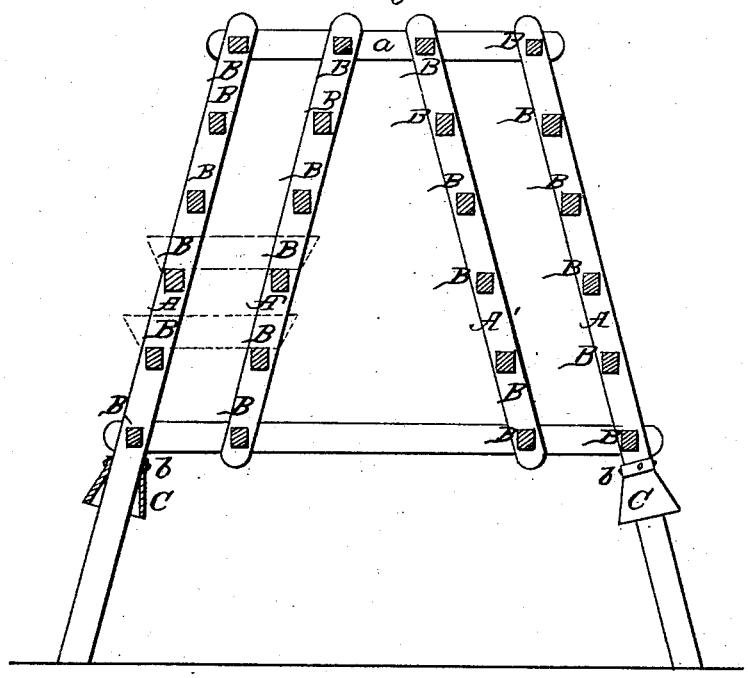
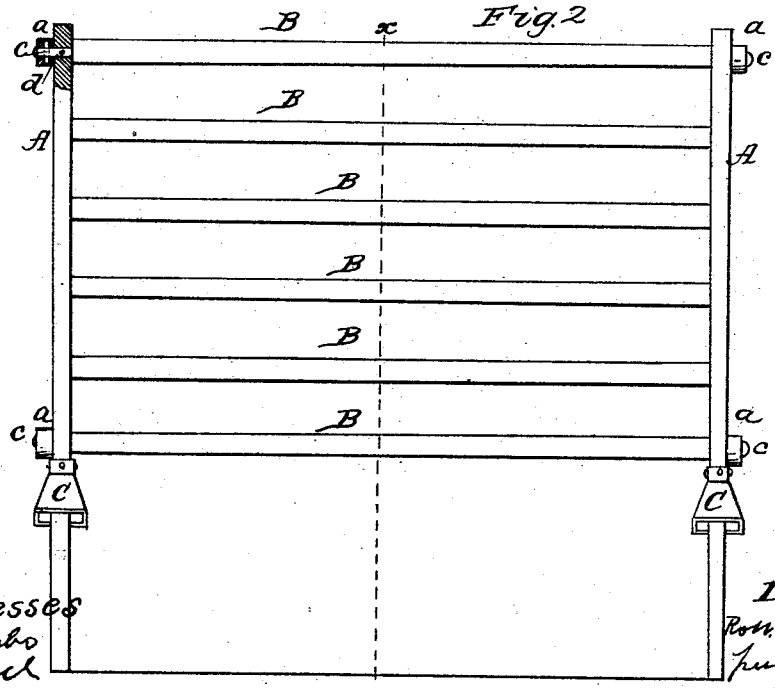

UNITED STATES PATENT OFFICE.

ROBERT CRUIKSHANK, OF SALEM, NEW YORK, ASSIGNOR TO HIMSELF, AND DANIEL B. COLE AND W. H. ARCHIBALD, OF SAME PLACE.

IMPROVEMENT IN MILK-RACKS.

Specification forming part of Letters Patent No. 38,625, dated May 19, 1863.

*To all whom it may concern:*

Be it known that I, ROBERT CRUIKSHANK, of Salem, in the county of Washington and State of New York, have invented a new and Improved Milk-Rack; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a side view of the same.

Similar letters of reference indicate corresponding parts in the two figures.

The object of this invention is to obtain a milk-rack of simple construction which will admit of being readily put up and taken down, and which will be capable of holding a large number of milk-pans within a limited space, and admit of a circulation of air all around the pans.

To enable those skilled in the art to fully understand and construct my invention, I will proceed to describe it.

A A A' A' represent four inclined strips, which are connected by two horizontal strips, $a\,a$. (See Fig. 1.) These strips form the side pieces of the device, into which the ends of horizontal slats B are fitted. The strips A are longer than the strips A', so that their lower parts will serve as feet for the device. The strips A' do not extend below the lower cross strip, $a$, as will be seen by referring to Fig. 1. The strips incline inward or toward each other from their lower toward their upper ends, and the strips A A' are placed at such a distance apart that the slats B will be sufficiently near together to form shelves for the milk-pans, which are shown in red in Fig. 1. The slats B may be of rectangular form in their transverse section, and it will be seen by referring to Fig. 1 that they are arranged in pairs in horizontal planes, so as to form the shelves; and it will also be seen by referring to the figure aforesaid that in consequence of having the strips A A' inclined the milk-pans on each shelf will be exposed at their outer sides, so that the milk may be strained and poured directly into them. A free circulation of air is allowed all around the milk-pans. On each strip A, just below the lower cross or horizontal strip, $a$, there is fitted a pyramidal-shaped sheet-metal guard, C. These guards are designed to prevent the ascent of rats and mice up the strips A. The guards C may be constructed of tinned plate, and they should be sufficiently flaring to prevent rats or mice from passing around them. They are made with flanges $b$, corresponding in size to the strips A, and fitting snugly to them, and tacked or nailed thereto if necessary. The horizontal strips or cross-pieces $a\,a$ are connected to the strips A A' by having tenons $c$ formed on the slats B, which are in line with them, said tenons passing through the strips A A' and cross-pieces $c$, and having pins $d$ pass through the latter and the tenons. (See Fig. 2.)

Having thus described my invention, what I claim as new, and desire to secure by Letters Patent, is—

The inclined strips A A, connected by cross-strips $a\,a$, and having the ends of horizontal slats B fitted in them, and all arranged, as herein shown and described, to form a new and improved milk-rack.

ROBERT CRUIKSHANK.

Witnesses:
A. ROBERTSON,
JOSEPH GILLIS.